Patented Mar. 21, 1933

1,902,385

UNITED STATES PATENT OFFICE

HIROSHI TANAKA, OF KOMAGOME, HONGO-KU, AND SHOICHIRO IMATOMI, OF IKEGAMI-MACHI, EBARA-GUN, TOKYO, JAPAN, ASSIGNORS TO ZAIDAN HOJIN RIKAGAKU KENKYUJO, OF TOKYO, JAPAN

METHOD OF PRODUCING $MgCl_2$ CONTAINING CHLORIDES OF ALKALI METALS OR ALKALINE EARTH METALS

No Drawing. Application filed March 8, 1929, Serial No. 345,594, and in Japan April 12, 1928.

This invention relates to an improvement in a process of producing anhydrous magnesium chloride by passing chlorine gas through magnesium sulphide or magnesium sulphide which contains or is mixed with magnesium oxide under heating.

According to this invention, not only magnesium sulphide, but also magnesium sulphide which contains or is mixed with magnesium oxide can be equally treated. Such material is mixed with chloride or sulphide of alkali metals or other of alkaline earth metals and the mixture is heated to a temperature from 400° to 800° C., passing chlorine gas or a reducing gas containing chlorine gas therethrough. By this process, anhydrous magnesium chloride containing chloride of an alkali metal or of an alkaline earth metal can be produced in melted state at a comparatively low temperature and with good yield.

The melting point of anhydrous pure magnesium chloride is 708° C. and the difference between the melting point and its vaporizing point is very small. Therefore, when preparing anhydrous magnesium chloride in melted state by passing chlorine gas through magnesium sulphide or same containing magnesium oxide, there is unavoidable loss of a part of the anhydrous magnesium chloride produced owing to its evaporation.

According to this invention, said drawback is entirely obviated by preparatory mixing one or more chloride or sulphide of alkali metals or of alkaline earth metals to the raw material, that is, to magnesium sulphide or the same containing magnesium oxide. When such mixture is treated with chlorine gas or a reducing gas containing chlorine gas under heating, the sulphide of the metal, when this is used, easily becomes the corresponding chloride and is melted together with magnesium chloride produced.

When chloride of the metal is used, this is directly melted together with magnesium chloride produced. This magnesium chloride containing chloride of alkali metal or alkaline earth metals such as Na, K, Li, Ca, Ba, Sr and the like has a melting point far lower than that of anhydrous pure magnesium chloride while its boiling point is higher than that of the same. Therefore, a partial loss of anhydrous magnesium chloride produced can be obviated. Moreover, the mixture of magnesium chloride and chloride of the metal is a very thin fluid in melted state so that the operation of chlorinating is made easier as well as its reaction is fully carried out at a comparatively low temperature.

The anhydrous $MgCl_2$ produced in this process is not separated from the chlorides of alkali metals or alkaline earth metals, the object of the invention being to manufacture a mixture of anhydrous $MgCl_2$ and the other chlorides melted together.

By the new method the melting is carried out at a comparatively low temperature so that the loss of $MgCl_2$ owing to its vaporization is possibly decreased.

Example I

First material: magnesium sulphide containing magnesium oxide.

|                        | Per cent |
|------------------------|----------|
| Magnesium sulphide     | 53.0     |
| Magnesium oxide        | 40.8     |
| Lime, alumina etc      | 4.2      |
| Iron                   | 0.7      |
| Water insoluble part   | 1.3      |

Second material: pure potassium chloride.

150 grams of the first material is mixed with 30 grams of the second material. The mixture is charged in a shaft furnace and is heated to 650° C., and chlorine gas is passed through. 230 grams of white crystal product flowed down on the lower part of the furnace, and which has the following composition.

| | Per cent |
|---|---|
| Anhydrous magnesium chloride | 84.1 |
| Potassium chloride | 13.3 |
| Calcium chloride and others | 2.0 |
| Iron | 0.15 |
| Insoluble matter | 0.4 |

*Example II*

First material:

| | Per cent |
|---|---|
| Magnesium sulphide | 95.0 |
| Magnesium oxide | 1.0 |
| Lime | 1.5 |
| Iron, aluminium etc | 2.1 |

Second material:

| | Parts |
|---|---|
| Potassium chloride | 1 |
| Sodium chloride | 1 |
| Lithium chloride | 1 |

45% of second material is mixed with first material, charged into a shaft furnace which is heated to 530° C. and chlorine gas is passed through. The percentages of yield are as follows:

| | Per cent |
|---|---|
| Anhydrous magnesium chloride | 75.3 |
| Potassium chloride | 8.0 |
| Sodium chloride | 7.8 |
| Lithium chloride | 7.5 |
| Calcium chloride | 1.1 |
| Water insoluble matter | 0.2 |

*Example III*

First material:

| | Per cent |
|---|---|
| Magnesium sulphide | 53.0 |
| Magnesium oxide | 40.0 |
| Lime, alumina etc | 4.2 |
| Iron | 0.7 |
| Water insoluble matter | 1.3 |

Second material: sodium chloride.

30% of second material is mixed with first material, charged into a furnace, which is heated to 700° C. and chlorine gas containing 20% of carbon mono-oxide is passed through. The percentages of the yield are as follows:

| | |
|---|---|
| Anhydrous magnesium chloride | 81.5% |
| Sodium chloride | 16.0% |
| Calcium chloride | 1.5% |
| Iron | trace. |
| Water insoluble matter | 0.8% |

*Example IV*

First material:

| | Per cent |
|---|---|
| Magnesium sulphide | 53.0 |
| Magnesium oxide | 40.8 |
| Lime, alumina etc | 4.2 |
| Iron | 0.7 |
| Water insoluble matter | 1.3 |

Second material: sodium sulphide.

20 grams of second material is added to 100 grams of first material. By the same treatment of the mixture as in the first example, the percentages of the yield are:

| | Per cent |
|---|---|
| Anhydrous magnesium chloride | 84.0 |
| Sodium chloride | 12.3 |
| Calcium chloride and others | 2.3 |
| Iron | 0.1 |
| Water insoluble matter | 0.5 |

*Example V*

First material:

| | Per cent |
|---|---|
| Magnesium sulphide | 53.0 |
| Magnesium oxide | 40.8 |
| Lime, alumina etc | 4.2 |
| Iron | 0.7 |
| Water insoluble matter | 1.3 |

Second material:

| | | Parts |
|---|---|---|
| Composition | Calcium sulphite | 2 |
| | Sodium chloride | 15 |
| | Potassium chloride | 15 |

32 grams of second material is added to 100 grams of first material, charged into a shaft furnace, heated to 600° C. and passed through chlorine gas. The percentages of the yield are:

| | Per cent |
|---|---|
| Anhydrous magnesium chloride | 81.0 |
| Sodium chloride | 7.8 |
| Potassium chloride | 7.9 |
| Calcium chloride and others | 2.7 |
| Iron | 0.05 |
| Water insoluble matter | 0.5 |

In the examples shown, it is easily verified by experiment that one can obtain similar results under the heating temperature in the range of 400° to 800° C.

Although pure magnesium sulphide which does not contain or is mixed with magnesium oxide is hardly obtained in industrial product, this of course can be treated in quite the same manner as the first materials shown in the examples.

We claim:

1. A process of producing anhydrous magnesium chloride containing a chloride of alkali metals or of alkaline earth metals; consisting in mixing magnesium sulphide with chloride of alkali metals, charging the mixture into a furnace, heating the mixture from 400° to 600° C., and passing chlorine gas therethrough while continuing the heating.

2. A process of producing anhydrous magnesium chloride containing chloride of alkali metals, consisting in mixing magnesium sulphide with sulphide of alkali metals, charging the mixture into a furnace, heating the mixture from 400° to 600° C., and passing chlorine gas therethrough while continuing the heating.

3. A process of producing anhydrous magnesium chloride containing chloride of alkaline earth metals, consisting in mixing magnesium sulphide with chloride of alkaline earth metals, charging the mixture into a furnace, heating the mixture from 400° to 600° C., and passing chlorine gas therethrough while continuing the heating.

4. A process of producing anhydrous magnesium chloride containing chloride of alkaline earth metals, consisting in mixing magnesium sulphide with sulphide of alkaline earth metals, charging the mixture into a furnace, heating the mixture from 400° to 600° C., and passing chlorine gas therethrough while continuing the heating.

5. A process of producing anhydrous magnesium chloride containing chloride of alkali metals consisting in mixing magnesium sulphide with chloride of alkali metals, charging the mixture into a furnace, heating the mixture from 400° to 600° C., and passing a reducing gas containing chloride gas therethrough while continuing the heating.

6. A process of producing anhydrous magnesium chloride containing chloride of alkali metals, consisting in mixing magnesium sulphide containing magnesium oxide, with sulphide of alkali metals, charging the mixture into a furnace, heating the mixture from 400° to 600° C., and passing a reducing gas containing chlorine gas therethrough while continuing the heating.

7. A process of producing anhydrous magnesium chloride containing chloride of alkaline earth metals, consisting in mixing magnesium sulphide containing magnesium oxide, with chloride of alkaline earth metals, charging the mixture into a furnace, heating the mixture from 400° to 600° C., and passing a reducing gas containing chlorine gas therethrough while continuing the heating.

8. A process of producing anhydrous magnesium chloride containing chloride of alkaline earth metals, consisting in mixing magnesium sulphide containing magnesium oxide, with sulphide of alkaline earth metals, charging the mixture into a furnace, heating the mixture from 400° to 600° C., and passing a reducing gas containing chlorine gas therethrough while continuing the heating.

In testimony whereof they affix their signatures.

HIROSHI TANAKA.
SHOICHIRO IMATOMI.